Dec. 15, 1964    J. A. PERRY, JR    3,161,051
LEVEL INDICATING DEVICE AND SYSTEM
Filed April 4, 1961    2 Sheets-Sheet 2

INVENTOR.
JOSEPH A. PERRY JR.
BY
ATTORNEY

United States Patent Office 3,161,051
Patented Dec. 15, 1964

3,161,051
LEVEL INDICATING DEVICE AND SYSTEM
Joseph A. Perry, Jr., Cedar Rapids, Iowa, assignor to Cherry-Burrell Corporation, Cedar Rapids, Iowa, a corporation of Delaware
Filed Apr. 4, 1961, Ser. No. 100,583
7 Claims. (Cl. 73—299)

This invention relates generally to means for measuring the pressure of a flowable product, and more particularly, this invention relates to a level indicating device and system of the type employing a diaphragm to one side of which air pressure is applied, the other side having pressure exerted thereon by the product.

There are many and various types of devices that can be used to measure the amount or pressure of a product stored in a tank or flowing through a pipeline. These devices may be responsive to pressure, volume or weight and are useful simply to indicate the pressure or quantity of product. They can also be used in various systems, for example, to control the amount of product added to or taken out of a tank or to maintain a constant level therein. My invention is directed to a pressure measuring device of the pneumatic type that is of a sanitary design and therefore can be used in connection with comestible products. Many of the devices of the prior art are not of sanitary design and therefore their utility is limited to applications where there are no sanitary standards to be met. Other devices do not give an indication of sufficient accuracy or are relatively expensive to manufacture.

It is therefore a principal object of my invention to provide pressure measuring means of a sanitary design.

It is another object of my invention to provide a pressure measuring means that can be used with any flowable product, particularly liquids, to measure the amount or level of the product in a tank or other vessel.

It is a further object of my invention to provide a pressure measuring device of the pneumatic type that is relatively trouble free in operation.

It is a still further object of my invention to provide a pneumatic presure measuring device that is simple and inexpensive to manufacture but which gives a measurement that is sufficiently accurte for most applications.

Figure 1:
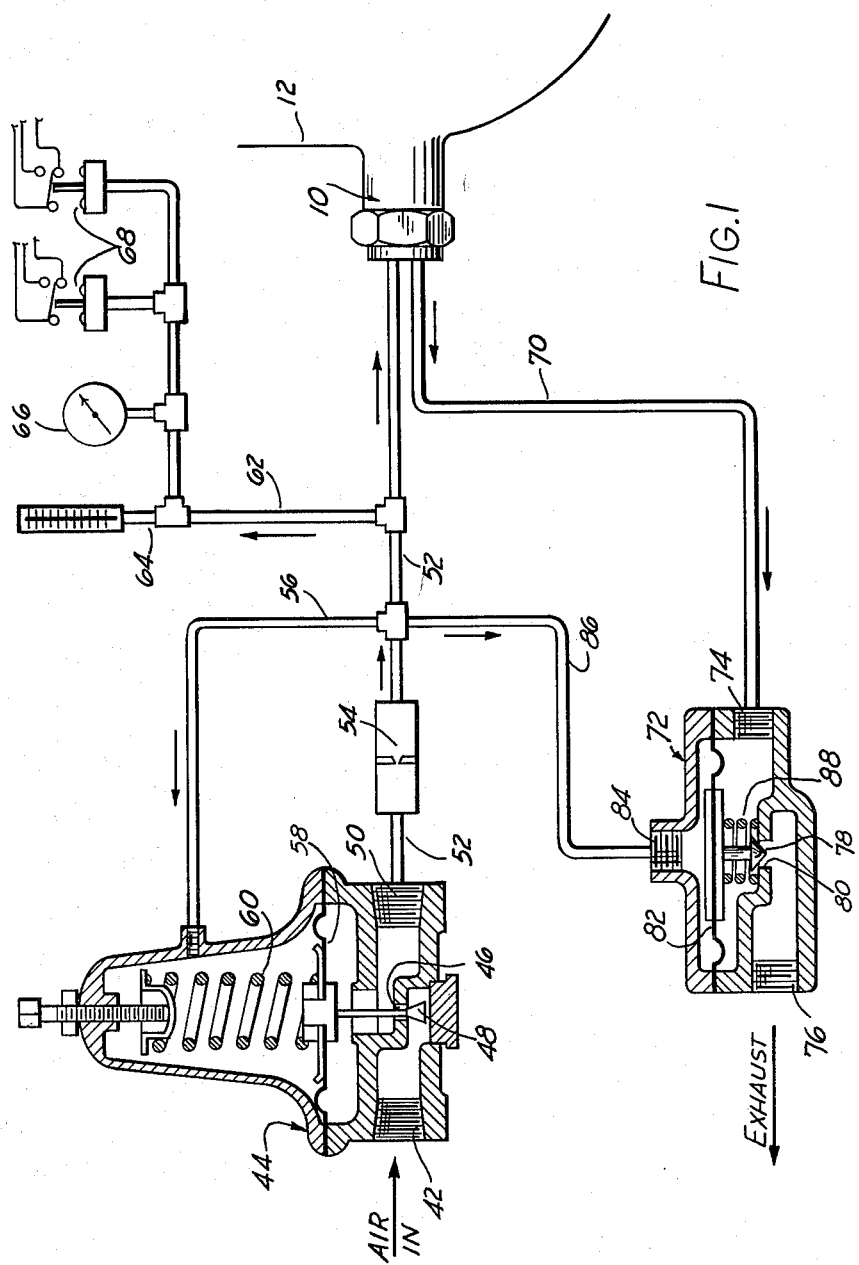
Figure 2:
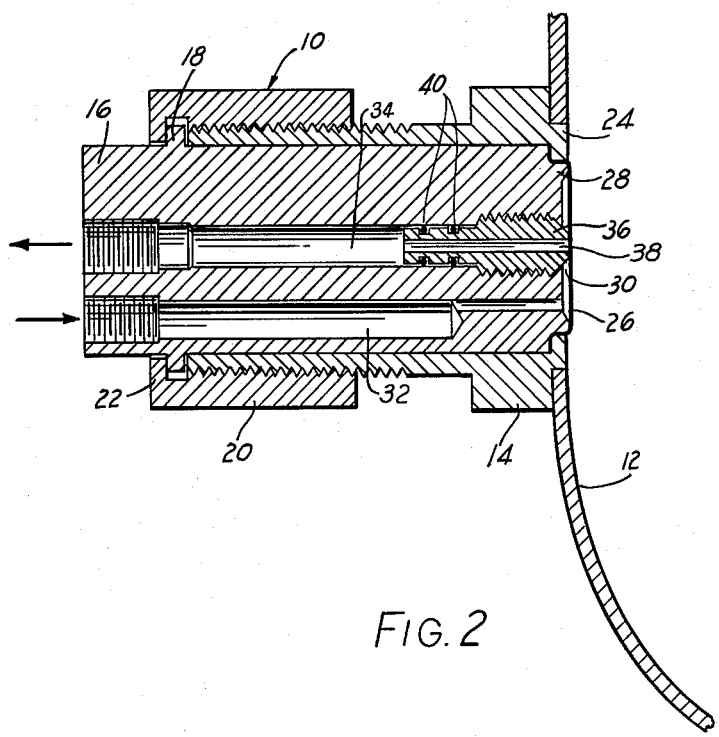

These and other objects of my invention will be readily apparent from a consideration of the following description taken in connection with the accompanying drawings in which:

FIGURE 1 is a schematice diagram of the air system and components necessary to make up a typical tank level indicating means; and FIGURE 2 is a sectional view of the pneumatic pressure measuring device.

My invention is shown, by way of example, as it is applied to a system for measuring the level of product in a tank. However, it is applicable to any system using the principle of pressure measurement.

Referring now to the drawings, the measuring device is indicated generally by the reference numeral 10 and may be mounted in the bottom or sidewalk of a tank or other storage vessel (not shown). The device 10 as shown is secured to the sidewall 12 of a tank by welding or otherwise suitably affixing one end of a cylindrical shell 14 thereto. The other or free end of the shell 14 is externally threaded. A main body member 16 is received in the shell 14 and is positioned therein by an annular flange 18 that abuts the free end of the cylindrical shell 14. Main body member 16 is held in the cylindrical shell 14 by a threaded nut 20 which has an inwardly extending flange 22 that engages the flange 18 of member 16 and forces it against the free end of the cylindrical shell 14.

At the end of cylindrical shell 14 fixed to the tank sidewall 12 there is an annular flange 24 that extends radially inward. The main body member 16 has an annular projection 28 the outside diameter of which is slightly less than the inside diameter of the flange 24 so that the projection 28 will fit inside the flange 24. A thin, flexible diaphragm 26 is stretched across the projection 28 and is held between the flange 24 and projection 28 and is further secured by being squeezed between the flange 24 and the end of the main body member 16. The material for diaphragm should be strong but resilient. Selection of the proper material is important to the accuracy of the device 10. The proper material is also important in the desecribed arrangement in order to provide an effective fluid-tight seal between the shell 14 and main body member 16.

Stretching the diaphragm 26 over the annular projection 28 at the end of main body member 16 forms an open space 30. An inlet passageway 32 extends longitudinally through the main body member 16 and terminates in the space 30. The inlet end of passageway 32 preferably is internally threaded to facilitate connection with a controlled air supply described hereinafter. An air exhaust or bleed passage 34 also extends through the center of the main body member 16 and terminates in the space 30. Thus, the inlet passage 32 and bleed passage 34 communicate with each other through space 30.

To attain the relatively high accuracy that my device and system will give, I prefer to have threaded in the end of bleed passageway 34 and extending into the space 30 an insert member 36 that has a small passageway 38 extending longitudinally therethrough. A screw driver slot (not shown) may be provided in one end of insert 36 to facilitate turning thereof. The bypass of air around the insert member is prevented by the means of two O rings 40 that seal the space between the insert 36 and the bleed passage 34. Since the insert 36 is threaded into the bleed passageway 32 its position can be adjusted to provide the proper clearance of about 0.001" between the diaphragm 26 and end of insert 36. Proper clearance is necessary in order to achieve high accuracy.

From the above description it can be seen that pressure will be exerted on the diaphragm 26 by the fluid product in the tank and this product pressure will be directly proportional to the level and density of fluid in the tank. Any amount of fluid in the tank will exert pressure on the diaphragm 26 forcing it against insert 36 and sealing off the passageway 38. Air pressure is controlled as described below and supplied to space 30 through inlet passage 32 on the other side of diaphragm 26. The applied air pressure will build up until it equals and then slightly exceeds the product pressure in the tank. At this point the air pressure will force the diaphragm 26 away from the passageway 38 and permit air to be bled off through the bleed passage 34. An equilibrium will therefore be established on both sides of the diaphragm 26 and a measurement of the air pressure will give an accurate indication of the product pressure.

In order that the measuring device 10 will give indications with a high degree of accuracy, I have found it necessary to add to the air system several components. In FIGURE 1 the complete air system for my device is shown schematically. Air is introduced into the system at the inlet 42 of a differential pressure regulator 44 of any suitable standard design. As shown, regulator 44 has a valve seat 46 upon which seats a valve member 48 that controls the flow of air from the inlet 42 to an outlet 50. Connected to outlet 50 is an air line 52 containing a fixed orifice 54, and down stream from orifice 54 a branch line 56 leads back into the top of the pressure regulator 44. Regulator 44 has a diaphragm 58 to one side of which air pressure is exerted through branch line 56. Air flowing through the regulator 44 from inlet 42 to outlet 50 exerts pressure on the opposite side of the diaphragm 58. A spring 60 tends to unseat valve member 48 by exerting force on diaphragm 58 that resists the line pressure flowing through the regulator 44. Thus, a constant pressure drop will be maintained across orifice 54, and this pressure drop will be equal to the force exerted by spring 60. The purpose of this arrangement is to provide an approximately constant rate of flow to the inlet passage 32 of the measuring device 10 and thereby minimize motion of the diaphragm 26 in the measuring device 10.

A second branch line 62 leads off the main line 52 to suitable indicating apparatus which may be a manometer 64 or a pressure gauge 66. Both of these types of indicating devices are shown by way of example but either one will give a reading of the air pressure exerted on diaphragm 26 or either one may be calibrated to read directly the level or quantity of fluid in the tank.

Also shown connected in branch line 62 is a pair of pressure switches 68. These may be used in a system, for example, to sound an alarm when the pressure exceeds set limits, pressure switches 68 being low and high limit switches, or the switches could control a pump (not shown) to supply fluid to maintain the tank level within the set limits.

I have found that if the air from the device 10 is bled directly to the atmosphere, diaphragm 26 will deflect at the point nearest the passageway 38 in insert 36. This distortion is caused by the pressure differential at that point on each side of the diaphragm 26 and the accuracy of the device 10 is thereby decreased. I therefore prefer to restrict the flow from the exhaust passage 34 to maintain the pressure therein just slightly less than the fluid product pressure on the other side of diaphragm 26. This could be accomplished by a simple orifice in an exhaust line 70 leading from exhaust passage 34, but since the product pressure in the tank varies, and thus the air pressure varies, it is preferable to maintain not a constant exhaust pressure but rather a constant pressure differential between the inlet passage 32 and exhaust passage 34. This pressure differential should be just enough to permit free flow from the inlet to the exhaust while still maintaining substantially the same pressure on each side of the diaphragm 26.

In order to provide for this pressure differential between the inlet 32 and exhaust 34 I prefer to use a back pressure regulator 72 in exhaust line 70. Regulator 72 may be of any suitable design, the one shown being by way of example only. Exhaust line 70 is connected to the inlet 74 of regulator 72, and air is discharged through outlet 76. Inlet 74 and outlet 76 are separated by a valve member 78 that seats on valve seat 80. A diaphragm 82 in regulator 72 separates inlet 74 and outlet 76 from a pilot line inlet 84. Air pressure is supplied to inlet 84 through a pilot line 86 that is connected to the line 52. A spring 88 tends to unseat valve member 78 by lifting the diaphragm 82.

Thus, with the pressure in pilot line 86 being exerted on one side of the diaphragm 82 thereby seating the valve member 78, back pressure will build up in line 70 until the pressure in the exhaust passage 34 of device 10 plus the pressure exerted by spring 88 is slightly greater than the pressure in inlet passage 32. Thus, if it is desired to maintain a differential pressure of say 0.25 p.s.i. between the inlet 32 and exhaust 34 of the device 10, spring 88 should be calibrated to exert 0.25 p.s.i. on diaphragm 82.

I have found the disclosed system and device to be very accurate even though they are simple and relatively inexpensive.

Accuracy in devices of this type is not inherent and not always easily attainable in commercial applications. With my novel system and device I have been able to obtain accuracies in the order of 0.1" $H_2O$ per 100" $H_2O$ product pressure. I attribute this accuracy chiefly to the use of the adjustable insert 36 and selection of proper material for diaphragm 26 in the device 10. Also, the constant flow regulator 44 and the back pressure regulator 72 contribute greatly to the superior performance I have obtained with the device 10.

My novel system has the further advantage of flexibility since the back pressure regulator 72 will provide the necessary pressure differential to prevent distortion of diaphragm 26 regardless of the product pressure. Pressure regulator 44 is adjustable to allow the system to be balanced so the output characteristics of the system when the tank is empty will be substantially zero. I have also found my novel system to have quick response to pressure changes without loss of accuracy.

The use of the diaphragm 26 in its dual function as a seal simplifies the device while still providing an effective sealing means. Although the sealing function necessitates use of a thicker diaphragm, the disadvantages are not of any consequence and are overcome by the use of the two regulators 44 and 72.

Although I have illustrated my invention fully in connection with a single embodiment it will be obvious to those skilled in the art that various revisions and modifications can be made without departing from the spirit and scope of the invention. It is therefore my intention that such revisions and modifications as are obvious to those skilled in the art will be included within the scope of the following claims.

I claim:

1. A device for measuring the level of a flowable product in a tank, said device comprising means for positioning the device in fixed relationship at substantially the lowest level of the tank, a main body member fixed to said positioning means, a flexible diaphragm positioned to provide a fluid-tight seal between said main body member and said positioning means, one side of said diaphragm being exposed to the product in said tank, means for supplying fluid pressure to the other side of said diaphragm, and bleed means for exhausting fluid from the last mentioned side of the diaphragm, said diaphragm and said positioning means providing a substantially smooth and uninterrupted surface on the inside of said tank.

2. A system for regulating fluid pressure supplied to a pressure sensing device of the type employing a thin flexible diaphragm, said system comprising means to provide a substantially constant flow of fluid into said device to exert pressure on one side of said diaphragm, means to exhaust fluid from said device to relieve said pressure, and means to maintain a constant differential between the pressure of the fluid supplied to said device and the pressure of the fluid exhausted therefrom.

3. A system for measuring the pressure of a fluid product comprising a pressure sensor including a thin flexible diaphragm movable in response to the pressure of said product, means to supply a second fluid to said sensor to resist said movement, means to exhaust said fluid from said sensor, an inlet regulating means to provide for a substantially constant flow of said second fluid into said sensor, an exhaust regulating means to build-up the exhaust fluid pressure and provide a constant pressure differential between the inlet and exhaust fluid pressures, and indicating means to show the inlet pressure and thereby measure the product pressure.

4. A fluid product pressure measuring device comprising a main body member having an opening extending therethrough, a nozzle adjustably positioned in said opening with the end of said nozzle located near one end of said opening, said nozzle having an exhaust passageway extending therethrough, a flexible diaphragm extending across the end of said nozzle and forming a space between said main body member, nozzle and one side of the diaphragm, a fluid inlet in said body member communicating with said space, and means for supplying fluid pressure through said inlet to said space, said diaphragm being intermittently engageable with the end of said nozzle to regulate the flow of pressure from said space to said exhaust passageway.

5. A fluid product pressure measuring device comprising a main body member having an opening extending therethrough, a nozzle adjustably positioned in said opening with the end of said nozzle located near one end of said opening, the opening at that end being wider than said nozzle to form an annular space, said nozzle having an exhaust passageway extending therethrough to the other end of said opening, a flexible diaphragm extending across the end of said nozzle and opening to enclose said annular space, a fluid inlet port communicating with said annular space, and means for supplying fluid pressure through said inlet port to said space, said diaphragm being intermittently engagable with the end of said nozzle to regulate the flow of pressure fluid from said space to said exhaust passageway.

6. A sanitary fluid product pressure measuring device comprising a hollow cylindrical shell open at both ends, an inwardly extending flange at one end thereof partially closing said end and defining a circular opening in said end, a main body member having a projection at one end received in said shell with said end seated against said annular flange and said projection extending into said opening, said main body member also having on said end an annular depression around said projection and within said opening, a flexible diaphragm positioned and held between the said end of said main body member and said flange and forming a fluid tight seal therebetween and a substantially smooth exterior surface on said device at said end, said diaphragm covering the depression in the said end of the main body member and forming a space therebetween and normally resting against said projection, first fluid passage means in said device connecting said space with the exterior of said device, second fluid passage means in said device connecting the exterior of said device and terminating at the outside of said projection, said diaphragm sealing off said second fluid passage means when pressure is exerted on the exterior of said diaphragm, and means at the other end of said body member and cylindrical shell to hold said member and said shell in assembled relationship.

7. The device of claim 6 in which said shell has means at said partially closed end providing for mounting of said device substantially flush with the interior surface of a fluid vessel.

References Cited by the Examiner
UNITED STATES PATENTS

| | | | |
|---|---|---|---|
| 1,631,909 | 6/27 | Badin | 73—302 |
| 2,265,114 | 12/41 | Hartley | 137—85 |
| 2,749,744 | 6/56 | Doudera et al. | 73—408 X |
| 2,953,917 | 9/60 | Kirk | 73—37.5 |

ISAAC LISANN, *Primary Examiner.*